(12) United States Patent
Fujioka (10) Patent No.: US 10,767,629 B2
(45) Date of Patent: Sep. 8, 2020

(54) WIND TURBINE POWER GENERATION FACILITY AND METHOD OF OPERATING THE SAME

(71) Applicant: MHI Vestas Offshore Wind A/S, Aarhus N (DK)

(72) Inventor: Hideyasu Fujioka, Aarhus N (DK)

(73) Assignee: MHI VESTAS OFFSHORE WIND A/S, Aarhus N (DK)

( * ) Notice: Subject to any disclaimer, the term of this patent is extended or adjusted under 35 U.S.C. 154(b) by 359 days.

(21) Appl. No.: 15/473,749

(22) Filed: Mar. 30, 2017

(65) Prior Publication Data
US 2018/0230968 A1 Aug. 16, 2018

(30) Foreign Application Priority Data
Feb. 10, 2017 (JP) .................. 2017-022706

(51) Int. Cl.
F03D 80/30 (2016.01)
F03D 7/02 (2006.01)
F03D 7/04 (2006.01)

(52) U.S. Cl.
CPC ......... *F03D 7/0268* (2013.01); *F03D 7/0264* (2013.01); *F03D 7/0276* (2013.01); *F03D 7/0288* (2013.01); *F03D 7/047* (2013.01); *F03D 80/30* (2016.05); *F05B 2240/221* (2013.01); *F05B 2270/101* (2013.01);
(Continued)

(58) Field of Classification Search
CPC combination set(s) only.
See application file for complete search history.

(56) References Cited

U.S. PATENT DOCUMENTS 6,407,900 B1    6/2002  Shirakawa et al.
6,586,920 B1 *  7/2003  Hirakawa ............... G01W 1/16
                                          324/72
(Continued)

FOREIGN PATENT DOCUMENTS

CN    102472254 A    5/2012
CN    204140284 U    2/2015
(Continued)

OTHER PUBLICATIONS

"Protection area by lightning rod", retrieved from Homepage at Internet, "http://surgerisk.sakura.ne.jp/Release_Protection_Area_By_Lightning_Rod.html", retrieved Jun. 19, 2017.
(Continued)

*Primary Examiner* — Lindsay M Low
*Assistant Examiner* — Teuta B Holbrook
(74) *Attorney, Agent, or Firm* — Kanesaka Berner and Partners LLP (57) ABSTRACT

A wind turbine power generation facility includes: at least one wind turbine power generating apparatus; a lightning sensor for detecting or predicting occurrence of lightning in an installation area of the at least one wind turbine power generating apparatus; and a controller for switching an operation mode of the at least one wind turbine power generating apparatus to a lightning-protection mode in which a rotor rotation speed is lower than a rated rotation speed, on the basis of an output signal of the lightning sensor.

15 Claims, 6 Drawing Sheets

(52) U.S. Cl.
CPC . *F05B 2270/1033* (2013.01); *F05B 2270/804* (2013.01); *Y02E 10/721* (2013.01); *Y02E 10/723* (2013.01)

(56) References Cited

U.S. PATENT DOCUMENTS

| | | | | |
|---|---|---|---|---|
| 7,282,944 | B2* | 10/2007 | Gunn | G01R 15/142 324/764.01 |
| 2003/0057703 | A1* | 3/2003 | Howes | F03D 7/043 290/1 R |
| 2003/0230898 | A1 | 12/2003 | Jamieson et al. | |
| 2004/0108732 | A1 | 6/2004 | Weitkamp | |
| 2005/0122083 | A1* | 6/2005 | Erdman | F03D 7/0224 322/20 |
| 2008/0069692 | A1* | 3/2008 | Oohara | F03D 7/0224 416/31 |
| 2008/0095624 | A1 | 4/2008 | Lewke | |
| 2009/0056968 | A1 | 3/2009 | Bertelsen | |
| 2009/0074574 | A1* | 3/2009 | Godsk | F03D 1/0641 416/41 |
| 2009/0202351 | A1* | 8/2009 | Rodriguez Sola | F03D 80/30 416/146 R |
| 2009/0232635 | A1* | 9/2009 | Menke | F03D 7/047 415/17 |
| 2010/0119370 | A1 | 5/2010 | Myhr | |
| 2010/0268849 | A1* | 10/2010 | Bengtson | G05B 15/02 709/248 |
| 2010/0295383 | A1* | 11/2010 | Cummings | H01L 31/02021 307/151 |
| 2010/0301607 | A1* | 12/2010 | Morimoto | F03D 1/0658 290/44 |
| 2010/0328084 | A1* | 12/2010 | Kraemer | G01R 29/0842 340/601 |
| 2011/0042950 | A1* | 2/2011 | Mizoue | F03D 7/0264 290/44 |
| 2011/0142643 | A1 | 6/2011 | Hardison et al. | |
| 2011/0182731 | A1* | 7/2011 | Naka | F03D 80/30 416/1 |
| 2011/0204631 | A1* | 8/2011 | Minami | F03D 7/047 290/44 |
| 2011/0267027 | A1 | 11/2011 | Iannotti et al. | |
| 2011/0298213 | A1* | 12/2011 | Minami | F03D 7/048 290/44 |
| 2011/0315670 | A1 | 12/2011 | Kathoefer | |
| 2012/0133143 | A1* | 5/2012 | Kimura | F03D 80/30 290/55 |
| 2012/0133146 | A1* | 5/2012 | Naka | H02G 13/00 290/55 |
| 2012/0133147 | A1* | 5/2012 | Numajiri | F03D 7/0268 290/55 |
| 2012/0162845 | A1* | 6/2012 | Sanchez | H02G 13/00 361/131 |
| 2012/0287549 | A1 | 11/2012 | Tanaka et al. | |
| 2013/0113212 | A1* | 5/2013 | Sakamoto | H02P 9/48 290/44 |
| 2013/0129508 | A1* | 5/2013 | Spruce | F03D 7/0224 416/1 |
| 2013/0134711 | A1* | 5/2013 | Spruce | F03D 7/0224 290/44 |
| 2013/0336786 | A1* | 12/2013 | Kissinger | F03D 80/30 416/1 |
| 2014/0015251 | A1* | 1/2014 | Hammerum | F03D 7/0264 290/44 |
| 2014/0093373 | A1* | 4/2014 | Schmidt | G01R 19/15 416/61 |
| 2014/0203563 | A1* | 7/2014 | Bowyer | F03D 7/0284 290/44 |
| 2014/0246857 | A1* | 9/2014 | Giertz | F03D 7/0264 290/44 |
| 2014/0319916 | A1* | 10/2014 | Cummings | H02J 1/102 307/53 |
| 2015/0050143 | A1* | 2/2015 | Kammer | F03D 17/00 416/1 |
| 2016/0047850 | A1 | 2/2016 | Bruins et al. | |
| 2016/0090963 | A1* | 3/2016 | Hoffmann | F03D 1/0675 416/223 R |
| 2017/0130698 | A1* | 5/2017 | Hoffmann | F03D 1/0675 |
| 2017/0167470 | A1* | 6/2017 | Markham | F03D 7/042 |
| 2017/0350369 | A1* | 12/2017 | Evans | F03D 13/20 |
| 2018/0238947 | A1* | 8/2018 | Birkl | G01R 29/0842 |

FOREIGN PATENT DOCUMENTS

| | | | |
|---|---|---|---|
| CN | 105443324 A | 3/2016 | |
| CN | 106089601 A | 11/2016 | |
| DE | 102015200370 A1 | 7/2015 | |
| DE | 102014202951 A1 | 8/2015 | |
| EP | 0707145 A1 | 4/1996 | |
| EP | 1011182 A1 | 6/2000 | |
| EP | 2190092 A2 * | 5/2010 | H02G 13/20 |
| EP | 2190092 A2 | 5/2010 | |
| JP | 2004036612 A | 2/2004 | |
| JP | 2004-225660 A | 8/2004 | |
| JP | 2005-633856 * | 9/2005 | H02H 3/22 |
| JP | 2005245190 A | 9/2005 | |
| JP | 2007100571 A | 4/2007 | |
| JP | 2009-115052 A | 5/2009 | |
| JP | 2012-149569 A | 8/2012 | |
| JP | 2012255431 A | 12/2012 | |
| JP | 2013148022 A | 8/2013 | |
| JP | 2014530988 A | 11/2014 | |
| JP | 2015-129493 A | 7/2015 | |
| JP | 2015-132245 A | 7/2015 | |
| JP | 2016-65500 A | 4/2016 | |
| KR | 10-2009-0056498 A | 3/2009 | |
| KR | 10-2011-0029863 A | 3/2011 | |
| WO | 94/25752 A1 | 11/1994 | |
| WO | 2011077970 A1 | 6/2011 | |
| WO | 2011099147 A1 | 8/2011 | |
| WO | 2012/113403 A1 | 8/2012 | |

OTHER PUBLICATIONS

"Guide to BS EN/IEC 62305—Lightning protection standard", Furse, retrieved from Homepage at Internet, www.furse.com, on Jun. 19, 2017.
Office Action in KR Application No. 10-2017-0040491, dated Dec. 29, 2017. 10pp.
Office Action for Japanese Application No. 2017-022706 dated Nov. 30, 2018; 8pp.
Office Action in EP Application No. 17155998.2, dated Jun. 4, 2018. 4pp.
Term "Lightning Detector" from Wikipedia, https://ja.wikipedia.org/wik/%E9%9B%B7%E6%A4%9C%E7%9F%A5%E5%99%A8, retrieved on Jun. 19, 2017.
"Thunder countermeasure of Hokuriku Electric Power Company", retrieved from company Homepage, http://www.rikuden.co.jp/kaminari/taisaku.html, on Jun. 19, 2017.
JIS A 4201 "Lightning protection of buildings etc., Key points of standard revision".
Office Action for European Application No. 17 155 998.2 dated Jan. 2, 2019; 5pp.
Extended European Search Report in EP Application No. 17155998.2, dated Aug. 25, 2017. 7pp.
Office Action for Chinese Application No. 201710270131.5 dated May 23, 2019; 10pp.

* cited by examiner

WIND TURBINE POWER GENERATION FACILITY AND METHOD OF OPERATING THE SAME

RELATED APPLICATIONS

The present application is based on, and claims priority from, Japanese Application Number 2017-022706, filed Feb. 10, 2017, the disclosure of which is hereby incorporated by reference herein in its entirety.

TECHNICAL FIELD

The present invention relates to a wind turbine power generation facility and a method of operating the wind turbine power generation facility.

BACKGROUND ART

In the wind power industry, damage to blades (wind turbine blades) due to lightning is becoming a serious problem. In view of this, wind turbine blades with a lightning protection function have been proposed.

For instance, Patent Document 1 discloses a structure equipped with a lightning receptor disposed in the vicinity of the tip of each blade.

CITATION LIST

Patent Literature

Patent Document 1: 2015-132245A

SUMMARY OF INVENTION

Technical Problem

Meanwhile, the recent increase in the tip speed associated with an increase in the blade length is increasing the risk of lightning strikes not only on the tips of blades but on any part of the blades. Further, if an initial leader is received on a blade before occurrence of a lightning strike while the rotor is rotating and the leader passes through a short distance before the first thunderbolt reaches, flashover may occur on a non-conductive surface of the blade, for instance, which increases the risk of expansion of damage from lightning.

In this regard, with the lightning protection structure disclosed in Patent Document 1, the receptors disposed on the blade tips may fail to capture lightning due to the increased tip speed accompanying the increase in the blade length, which may bring about a serious damage to the blades.

An object of at least some embodiments of the present invention is to reduce damage to blades upon occurrence of lightning.

Solution to Problem (1) A wind turbine power generation facility according to at least one embodiment of the present invention comprises: at least one wind turbine power generating apparatus; a lightning sensor for detecting or predicting occurrence of lightning in an installation area of the at least one wind turbine power generating apparatus; and a controller for switching an operation mode of the at least one wind turbine power generating apparatus to a lightning-protection mode in which a rotor rotation speed is lower than a rated rotation speed, on the basis of an output signal of the lightning sensor.

The higher the tip speed of the blades is (or the higher the rotor rotation speed is), the more difficult it is to capture lightning with a receptor, which increases the risk of damage to the blades.

In this regard, with the above configuration (1), the wind-turbine power generation facility includes the lightning sensor, and thus can detect or predict occurrence of lightning in the installation area of the wind turbine power generating apparatus. The controller can switch the operation mode of the wind turbine power generating apparatus to the lightning-protection mode in which the rotor rotation speed is lower than the rated rotation speed, on the basis of an output signal of the lightning sensor, and thus it is possible suppress the rotor rotation speed to a low level upon occurrence of lightning in the installation area of the wind turbine power generating apparatus. Accordingly, it is possible to reduce the tip speed of the blades as compared to a case in which blades are rotating at a rated rotation speed when hit by lightning, which makes it possible to prevent lightning strikes on an unexpected portion on the blades and to mitigate damage to the blades upon occurrence of lightning.

(2) In some embodiments, in the above configuration (1), the controller is configured to shift a state of the at least one wind turbine power generating apparatus to a standby state in which power generation is stopped without fixing a rotor, upon switch to the lightning-protection mode.

With the above configuration (2), the controller can shift the state of the wind turbine power generating apparatus to a state in which power generation is stopped without fixing the rotor, upon switch to the lightning-protection mode. In other words, when the state of the wind turbine power generating apparatus is shifted to the standby state by the controller, power generation can be stopped in a state in which the rotation speed of the rotor is lower than the rated rotation speed but the rotor is not completely stopped.

(3) In some embodiments, in the above configuration (1) or (2), the lightning-protection mode satisfies at least one of a first condition that the rotor rotation speed of the at least one wind turbine power generating apparatus is 2 rpm or less, or a second condition that a blade tip speed of the at least one wind turbine power generating apparatus is 15 m/s or less.

The rated rotation speed of a wind turbine varies depending on the size of the wind turbine and other conditions, but is normally set to approximately 10 to 50 rpm.

In this regard, with the above configuration (3), the operation mode of the wind turbine power generating apparatus is shifted to the lightning-protection mode by the controller, and thereby satisfies at least one of the first condition that the rotor rotation speed of the wind turbine power generating apparatus is 2 rpm or less, or the second condition that the tip speed of the blades of the wind turbine power generating apparatus is 15 m/s or less. Thus, it is possible to reduce the rotation speed of the rotor in the lightning-protection mode sufficiently as compared to the rated rotation speed, thereby preventing lightning strikes on an unexpected portion of the blades and reducing damage to the blades due to lightning. Accordingly, it is possible to mitigate damage to the blades upon occurrence of lightning.

(4) In some embodiments, in the above configuration (1), the controller is configured to shift a state of the at least one wind turbine power generating apparatus to a stop state in which a rotor is stopped and power generation is stopped, upon switch to the lightning-protection mode.

With the above configuration (4), it is possible to shift the state of the wind turbine power generating apparatus to the stop state in which the rotor is stopped and power generation is stopped by shifting the operation mode of the wind turbine power generating apparatus to the lightning-protection mode by the controller. Accordingly, the wind turbine power generating apparatus is in the stop state in which the rotation speed of the rotor is the lowest, which makes it possible to prevent lightning strikes on an unexpected portion of the blades and to mitigate damage to the blades upon occurrence of lightning as compared to a case in which the rotor is rotating at the rated rotation speed when hit by lightning. Further, for instance, if the wind turbine power generating apparatus is stopped while the rotor is positioned at a particular angle, it is possible to stand by with the rotor and power generation stopped until the risk of occurrence of lightning decreases, while the rotor is still positioned at the particular angle.

(5) In some embodiments, in the above configuration (4), the at least one wind turbine power generating apparatus is configured to stop the rotor so that all blades are positioned in an azimuth-angular range other than a first angular range of more than 80 degrees and less than 100 degrees, and a second angular range of more than 260 degrees and less than 280 degrees, in the lightning-protection mode.

According to findings of the present inventors, the risk of being hit by lightning varies depending on the azimuth-angular range in which the rotor is positioned. The present inventors conducted intensive researches and found that it is possible to reduce the risk of lightning strikes on an unexpected portion of the blades considerably by avoiding a situation in which the blades are positioned in the first and second angular ranges described in the above (5).

With this configuration (5), the rotor can be stopped so that all the blades are positioned in an azimuth-angular range other than the first and second angular ranges, and thus it is possible to reduce the risk of lightning strikes on the blades considerably. Accordingly, it is possible to mitigate damage to the blades upon occurrence of lightning.

(6) In some embodiments, in any one of the above configurations (1) to (5), the at least one wind turbine power generating apparatus has a rotor diameter of 70 m or more.

With the above configuration (6), it is possible to mitigate damage to the blades upon occurrence of lightning even for a large wind turbine having a rotor diameter of 70 m or more, for instance.

(7) In some embodiments, in any one of the above configurations (1) to (6), the lightning sensor includes at least one of an optical sensor for detecting light which occurs accompanying the lightning, or a sonic sensor for detecting sound which occurs accompanying the lightning.

With the above configuration (7), since the lightning sensor includes at least one of the optical sensor or the sonic sensor, the lightning sensor can detect occurrence of lightning by detecting light or sound that occurs accompanying lightning. Accordingly, the controller can execute a process to shift the operation mode of the wind turbine power generating apparatus to the lightning-protection mode upon occurrence of lightning in the installation area of the wind turbine power generating apparatus or in the vicinity thereof, in response to a trigger, which is light or sound that occurs accompanying the lightning.

(8) In some embodiments, in any one of the above configurations (1) to (7), the lightning sensor includes an electromagnetic-wave sensor for detecting electromagnetic waves which occur accompanying the lightning.

With the above configuration (8), since the lightning sensor includes the electromagnetic-wave sensor, the lightning sensor can detect occurrence of lightning by detecting electromagnetic waves that occur accompanying lightning. Accordingly, the controller can execute a process to shift the operation mode of the wind turbine power generating apparatus to the lightning-protection mode upon occurrence of lightning in the installation area of the wind turbine power generating apparatus or in the vicinity thereof, in response to a trigger, which is electromagnetic waves that occur accompanying the lightning.

(9) In some embodiments, in any one of the above configurations (1) to (8), the lightning sensor includes an electric-charge sensor configured to detect electric charge accumulated in cloud or on ground.

With the above configuration (9), since the lightning sensor includes the electric-charge sensor, the lightning sensor can predict occurrence of lightning by detecting electric charge accumulated in cloud or on the ground. That is, the controller can execute a process to shift the operation mode of the wind turbine power generating apparatus to the lightning-protection mode in advance before occurrence of lightning in the installation area of the wind turbine power generating apparatus or in the vicinity thereof, in response to a trigger, which is an electric charge accumulated in cloud or on the ground being greater than a predetermined threshold.

(10) In some embodiments, in any one of the above configurations (1) to (9), the lightning sensor includes a coherer.

A coherer is an electromagnetic-wave detecting element with a high sensitivity for detecting electromagnetic shock waves (lightning) and static electric charge.

With the above configuration (10), the controller can execute a process to shift the operation mode of the wind turbine power generating apparatus to the lightning-protection mode upon occurrence of lightning in the installation area of the wind turbine power generating apparatus or in the vicinity thereof, in response to a trigger, which is electromagnetic waves that occur accompanying lightning. Further, with the coherer, the lightning sensor can predict occurrence of lightning in the installation area of the wind turbine power generating apparatus by detecting a rapid change in the electrostatic field between the atmosphere and the ground immediately before a lightning strike. Accordingly, the controller can execute a process to shift the operation mode of the wind turbine power generating apparatus to the lightning-protection mode in advance before occurrence of lightning in the installation area of the wind turbine power generating apparatus or in the vicinity thereof, in response to a trigger, which is a change in the electrostatic field between the atmosphere and the ground.

(11) In some embodiments, in any one of the above configurations (1) to (10), the controller includes a processor configured to receive the output signal of the lightning sensor and to determine whether to switch the operation mode to the lightning-protection mode in accordance with operation-mode switching logics.

With the above configuration (11), the controller can use the processor to determine whether to switch the operation mode to the lightning-protection mode in accordance with the operation-mode switching logics on the basis of an output signal from the lightning sensor. That is, it possible to operate the wind turbine power generating apparatus so as to be able to respond to various conditions for switching the operation mode by setting a variety of operation-mode switching logics.

(12) A method of operating a wind turbine power generation facility including at least one wind turbine power generating apparatus, according to at least one embodiment of the present invention, comprises: obtaining detection information or prediction information of occurrence of lightning in an installation area of the at least one wind turbine power generating apparatus; and switching an operation mode of the at least one wind turbine power generating apparatus to a lightning-protection mode in which a rotor rotation speed is lower than a rated rotation speed, on the basis of the detection information or the prediction information of the lightning.

According to the above method (12), it is possible to switch the operation mode of the wind turbine power generating apparatus to the lightning-protection mode in which the rotor rotation speed is lower than the rated rotation speed, on the basis of detection information or prediction information of occurrence of lightning in the installation area of the wind turbine power generating apparatus. Accordingly, as described in the above (1), it is possible to prevent lightning strikes on an unexpected portion of the blades, and to mitigate damage to the blades upon occurrence of lightning.

(13) In some embodiments, in the above method (12), the step of switching the operation mode to the lightning-protection mode includes shifting a state of the at least one wind turbine power generating apparatus to a standby state in which power generation is stopped without fixing a rotor.

According to the above method (13), as described in the above (2), when the state of the wind turbine power generating apparatus is shifted to the standby state by the controller upon switch to the lightning-protection mode, power generation can be stopped in a state in which the rotation speed of the rotor is lower than the rated rotation speed but the rotor is not completely stopped. Accordingly, when lightning is accompanied by strong wind, for instance, it is possible to standby in a state in which power generation is stopped while letting loads applied to the rotor escape until the risk of occurrence of lightning decreases.

(14) In some embodiments, in the above method (12), the step of switching the operation mode to the lightning-protection mode includes shifting a state of the at least one wind turbine power generating apparatus to a stop state in which a rotor is stopped and power generation is stopped.

According to the above method (14), as described in the above (4), it is possible to shift the state of the wind turbine power generating apparatus to the stop state in which the rotor is stopped and power generation is stopped, by shifting the operation mode of the wind turbine power generating apparatus to the lightning-protection mode by the controller. Accordingly, the wind turbine power generating apparatus is in the stop state in which the rotation speed of the rotor is the lowest, which makes it possible prevent lightning strikes on an unexpected portion of the blades and to mitigate damage to the blades upon occurrence of lightning as compared to a case in which the rotor is rotating at the rated rotation speed when hit by lightning. Further, for instance, if the wind turbine power generating apparatus is stopped while the rotor is positioned at a particular angle, it is possible to stand by with the rotor and power generation stopped until the risk of occurrence of lightning decreases, while the rotor is still positioned at the particular angle.

(15) In some embodiments, in the above method (14), the step of switching the operation mode to the lightning-protection mode includes stopping the rotor so that all blades are positioned in an azimuth-angular range other than a first angular range of more than 80 degrees and less than 100 degrees, and a second angular range of more than 260 degrees and less than 280 degrees.

According to the above method (15), as described in the above (5), the rotor can be stopped so that all the blades are positioned in an azimuth-angular range other than the first and second angular ranges, and thus it is possible to reduce the risk of lightning strike on the blades considerably. Accordingly, it is possible to mitigate damage to the blades upon occurrence of lightning.

Advantageous Effects of Invention

According to at least one embodiment of the present invention, it is possible to suppress the rotor rotation speed to a low speed upon occurrence of lightning in the installation area of a wind turbine power generating apparatus.

DESCRIPTION OF EMBODIMENTS

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
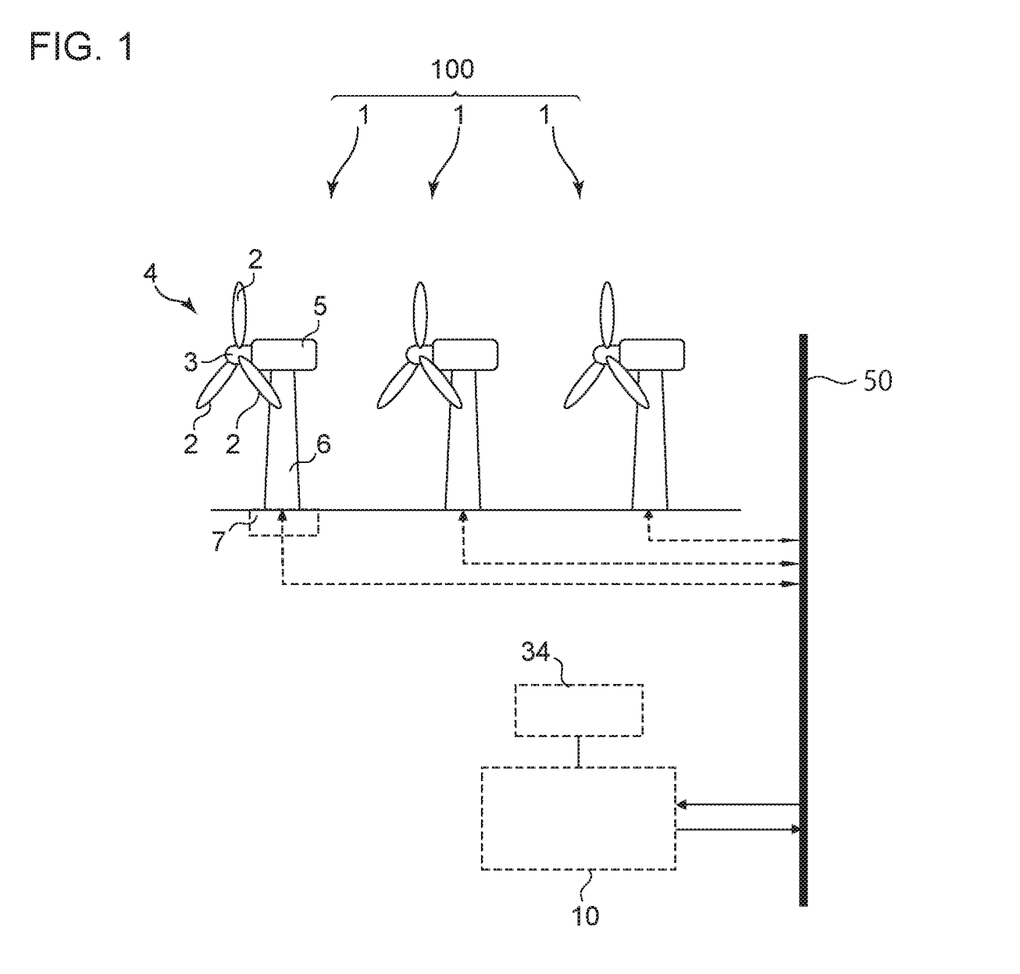
FIG. 1 is a schematic diagram of a configuration example of a wind turbine power generation facility according to an embodiment.

FIG. 1 is a schematic diagram of a configuration example of a wind turbine power generating facility according to an embodiment.

As depicted in FIG. 1, a wind turbine power generation facility 100 according to at least one embodiment of the present invention includes at least one wind turbine power generating apparatus (hereinafter, referred to as wind turbine) 1, a lightning sensor 34 for detecting or predicting occurrence of lightning in the installation area of the wind turbine 1, and a controller 10 for switching the operation mode of the wind turbine 1 to a lightning-protection mode which operates the wind turbine 1 at a rotor rotation speed lower than the rated rotation speed, on the basis of an output signal of the lightning sensor 34. The wind turbine power generation facility 100 may include one wind turbine 1, or may be a wind farm (wind park) including a plurality of wind turbines 1. Similarly, the controller 10 may be provided corresponding to one wind turbine 1, or may be a wind farm controller capable of performing an integrated control on a plurality of wind turbines 1 that constitute a wind farm.

Herein, if lightning hits the wind turbine 1, the higher the tip speed of blades 2 described below (or the higher the rotation speed of a rotor 4 described below), the greater the risk of lightning hitting an unexpected portion of a blade 2. In this regard, the above wind-turbine power generation facility 100 includes the lightning sensor 34, and thus can detect or predict occurrence of lightning in the installation area of the wind turbine 1. The controller 10 can switch the operation mode of the wind turbine 1 to the lightning-protection mode in which the rotor rotation speed is lower than the rated rotation speed, on the basis of an output signal of the lightning sensor 34. Accordingly, it is possible to suppress the tip speed of the blades 2 in the lightning-protection mode, as compared to a case in which the blades 2 are rotating at the rated rotation speed when hit by lightning. Thus, it is possible to prevent lightning from hitting an unexpected portion of the blades 2 upon occurrence of lightning, and to mitigate damage to the blades 2.

The most serious damage to the blades 2 due to lightning occurs when lightning hits an unprotected portion on the surface of a blade 2 and forms a high-energy arc inside the blade 2. Such an arc inside the blade 2 generates a high-pressure shock wave which may rip the surface of the blade 2 off from a cylindrical member inside the blade 2 along an edge portion to explode the blade 2, or may bring about pressure loss of the other blades 2 if the pressure propagates to the other blades from the lightning-hit blade 2 through a hub 3 (described below). As described above, damage to a blade 2 due to lightning occurs in various levels, from generation of cracks on the surface of the blade 2 to complete destruction of the blade 2, and the opportunity to increase the yearly power generation capacity may be lost if troubles caused by lightning are left unattended.

Now, each part of the wind turbine power generation facility 100 will be described.

As depicted in FIG. 1, in some embodiments, each wind turbine 1 includes a rotor 4 including a plurality (three in the example of FIG. 1) of blades 2 and a hub 3 to which the blades 2 are mounted, a nacelle 5 rotatably supporting the rotor 4 via a main shaft and a main bearing (not depicted), a generator (not depicted) driven by a rotational force of the main shaft, a tower 6 supporting the nacelle 5 so as to be rotatable in the horizontal direction, and a base 7 for installing the tower 6.

Figure 3:
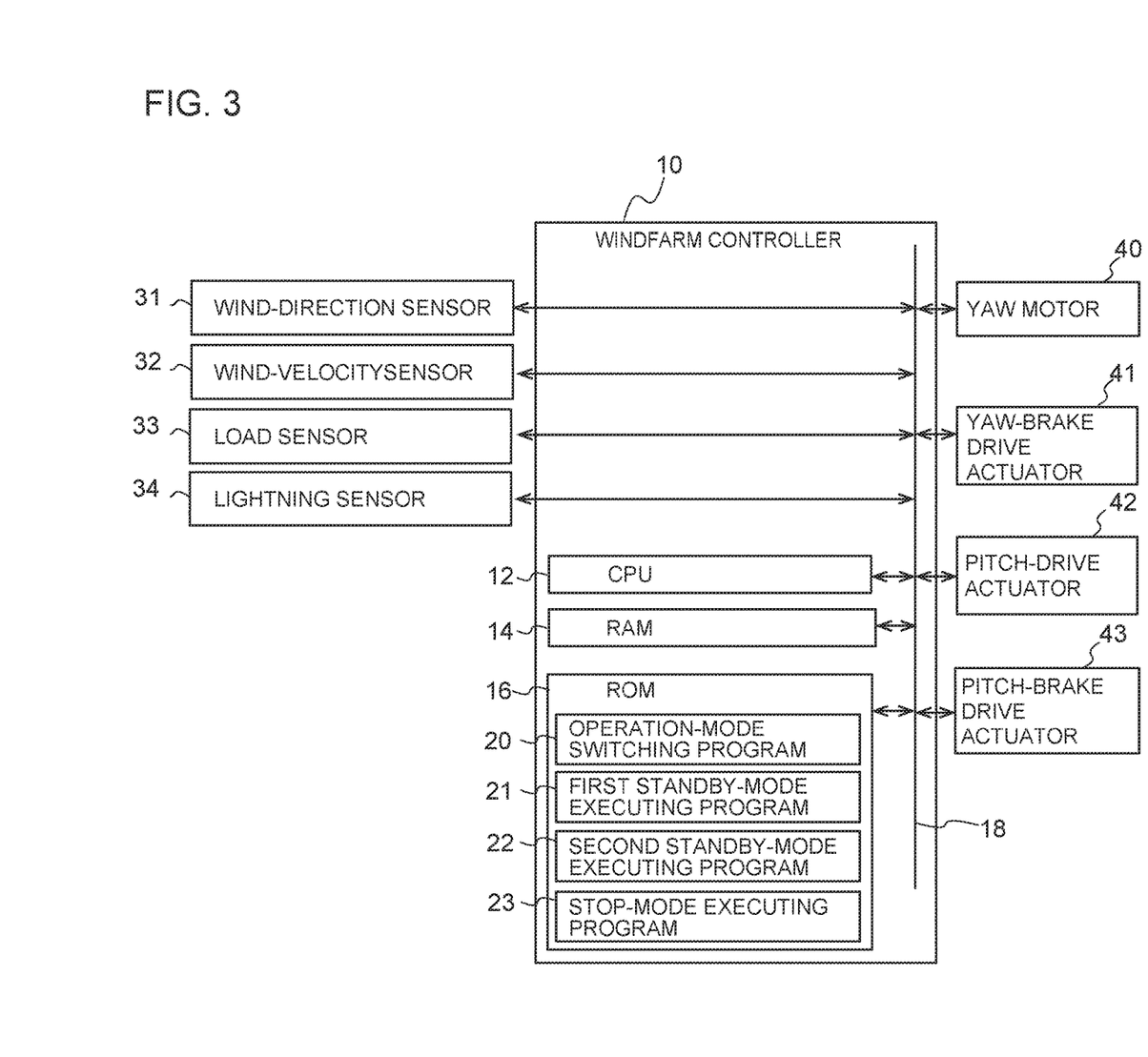
FIG. 3 is a control block diagram of a configuration of a control system of a wind turbine power generating apparatus according to an embodiment.

Each blade 2 is mounted to the hub 3 at the blade root portion so as to be rotatable about the axis along the longitudinal direction of the blade 2, and is configured so that the pitch angle is adjustable by a pitch-drive actuator 42 (see FIG. 3). The number of blades 2 may be greater than three, or smaller than three. Actuators (see FIG. 3) for driving various components of the wind turbine 1, that serve as driving units, include the above pitch-drive actuator 42, a yaw motor 40, a yaw-brake drive actuator 41, and a pitch-brake drive actuator 43, and are connected to the controller 10 electrically via a wired or wireless signal line 50.

In some embodiments, the rotor 4 may have a diameter of 70 m or more. As the length of the blades 2 increases, the tip speed of the blades 2 increases in association with an increase in the diameter of the rotor 4, and thus damage to the blades 2 becomes more serious when hit by lightning. In this regard, with the configuration of at least one embodiment disclosed herein, it is possible to mitigate damage to the blades 2 upon occurrence of lightning even for a large wind turbine having a rotor diameter of 70 m or more, for instance.

Next, the lightning sensor 34 according to some embodiments will be described.

The lightning sensor 34 is configured to detect occurrence of lightning in the installation area of the wind turbine 1, on the basis of a change in various physical parameters that accompanies thunderbolt that is occurring at the moment, or to predict occurrence of lightning in the installation area of the wind turbine 1 on the basis of weather information in the installation area or in the vicinity thereof or a change in various physical parameters before occurrence of lightning. The lightning sensor 34 is configured to transmit a detection signal indicating detection or prediction of lightning to the controller 10 when the lightning sensor 34 detects or predicts occurrence of lightning. In some embodiments, the lightning sensor 34 may be mounted to the wind turbine 1. In another embodiment, the lightning sensor 34, which is provided as one of a variety of different types, may be disposed in a position appropriate for detecting the corresponding detection target within the installation area of the wind turbine 1 or in the vicinity thereof, in accordance with the type of the lightning sensor 34.

In some embodiments, the lightning sensor 34 may include at least one of an optical sensor for detecting light that occurs accompanying lightning, or a sonic sensor for detecting sound that occurs accompanying lightning.

The optical sensor is configured to detect occurrence of lightning by detecting light (lightning flash) emitted from thunderbolt, which is an electric discharge generated in the atmosphere. The sonic sensor is configured to detect occurrence of lightning by detecting sound (thunder) emitted from thunderbolt. In some embodiments, the optical sensor and the sonic sensor may be provided as an integrated light-sound detection sensor capable of detecting at least one of light or sound of thunderbolt that occurs in association with occurrence of lightning.

With the above configuration, the controller 10 can execute a process for shifting the operation mode of the wind turbine 1 to the lightning-protection mode upon occurrence of lightning in the installation area of the wind turbine 1 or in the vicinity thereof, in response to a trigger, which is a detection signal indicating detection of light or sound that occurs accompanying the lightning.

In some embodiments, the lightning sensor 34 may include an electromagnetic-wave sensor for detecting electromagnetic waves that occur accompanying lightning.

The electromagnetic-wave sensor is configured to detect occurrence of lightning by detecting electromagnetic waves emitted from thunderbolt, which is an electric discharge generated in the atmosphere. While electromagnetic waves emitted from thunderbolt are mainly detected as noise, the electromagnetic-wave sensor may be a lightning location system (LLS) that can detect electromagnetic waves emitted upon a lightning strike exclusively on the basis of the characteristics of electromagnetic waves emitted from thunderbolt.

The above described optical sensor and sonic sensor may not be fully capable of detecting lightning that occurs far away, due to the limited reach of lightning flash and thunder sound, and thus are provided mainly to detect lightning that occurs in the vicinity of the installation point of the lightning sensor 34. In contrast, the electromagnetic-wave sensor is capable of detecting thunderbolt that occurs far away, and of predicting motion of thundercloud by calculation, approaching and moving away, from the occurrence position of the thunderbolt or the like.

With the above configuration, since the lightning sensor 34 includes the electromagnetic-wave sensor, the lightning sensor 34 can detect occurrence of lightning by detecting electromagnetic waves that occur accompanying lightning. Accordingly, the controller 10 can execute a process to shift the operation mode of the wind turbine 1 to the lightning-protection mode upon occurrence of lightning in the installation area of the wind turbine 1 or in the vicinity thereof, in response to a trigger, which is a detection signal indicating detection of electromagnetic waves that occur accompanying lightning.

In some embodiments, the lightning sensor 34 may include an electric-charge sensor configured to detect electric charge accumulated in cloud or on ground.

When thunder cloud is formed, electric charge is accumulated between the thundercloud and the ground. It is possible to predict occurrence of lightning flash or a thunderbolt by detecting the charging between the thundercloud and the ground. Specifically, the electric-charge sensor can detect occurrence and approach of thundercloud and to predict occurrence of lightning by detecting an electric field formed between thunder cloud and the ground, and detecting energy, displacement, and a changing state of the electric field, for instance. Further, the electric-charge sensor may be configured to detect occurrence of lightning by detecting corona current, which is discharged from a protrusion on the ground surface upon generation of thundercloud. The electric-charge sensor is based on electric charge and thus not suitable for prediction of occurrence of remote lightning, but is suitable for prediction of lightning that occurs relatively near the installation point of the lightning sensor 34. Such an electric-charge sensor for detecting electric charge and an electromagnetic-wave sensor for detecting electromagnetic waves may be combined to make a system that can be used as the lightning sensor 34.

With the above configuration, since the lightning sensor 34 includes the electric-charge sensor, the lightning sensor 34 can predict occurrence of lightning by detecting electric charge accumulated in cloud or on the ground. That is, the controller 10 can execute a process to shift the operation mode of the wind turbine 1 to the lightning-protection mode in advance before occurrence of lightning in the installation area of the wind turbine 1 or in the vicinity thereof, in response to a trigger, which is a detection signal indicating that an electric charge accumulated in cloud or on the ground is greater than a predetermined threshold.

In some embodiments, the lightning sensor 34 may include a coherer.

Figure 2:
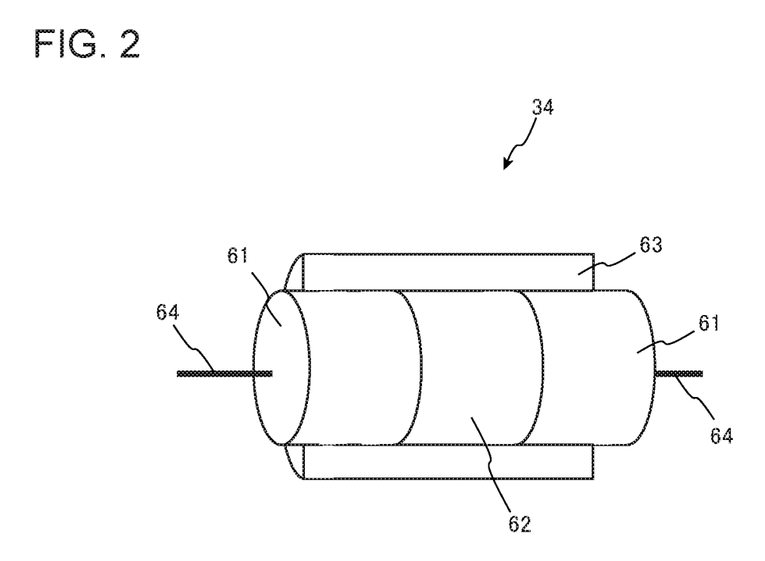
FIG. 2 is a schematic diagram of a coherer, an example of a lightning sensor according to an embodiment.

A coherer is an electromagnetic-wave detecting element with a high sensitivity for detecting electromagnetic shock waves (lightning) and static electric charge. Specifically, as depicted in FIG. 2, the coherer includes a pair of electrodes 61, 61, a metal powder 62 loosely held between the pair of electrodes 61, 61, an insulating member 63 (e.g. glass tube) enclosing the pair of electrodes 61, 61 and the metal powder 62 inside thereof, and lead wires 64 each connected to a corresponding one of the electrodes 61, 61. The coherer is characterized in that the electric resistance between the pair of electrodes 61, 61 rapidly decreases upon receiving electromagnetic waves, which can be used to detect electromagnetic waves. The coherer is an impulse-operation switch and thus can be used also as the lightning sensor 34, which makes it possible to perform both of detection and prediction of occurrence of lightning (thunderbolt) with a single coherer.

Although not suitable for prediction of lightning that occurs far away due to its sensitivity limit, the coherer is capable of predicting lightning within a range of about 1,000 meters, which is especially influential on the electric and communication facilities. Further, since electromagnetic waves from thunderbolt can be detected, occurrence of lightning can be detected in an even larger area. The coherer is tough for being a lightning protector itself, and is capable of directly detecting a rapid change in ground electric potential (electric-charge change) before occurrence of a lightning strike, in addition to electromagnetic waves from thunderbolt, with a simple analog circuit configuration. Thus, the coherer does not require an extensive computation circuit for eliminating disturbance, and thus it is possible to evaluate the risk of lightning strikes in the vicinity of the installation point of the lightning sensor 34 continually and accurately.

With the above configuration, the controller 10 can execute a process to shift the operation mode of the wind turbine 1 to the lightning-protection mode upon occurrence of lightning in the installation area of the wind turbine 1 or in the vicinity thereof, in response to a trigger, which is a detection signal indicating detection of electromagnetic waves that occur accompanying the lightning. Further, with the coherer, the lightning sensor 34 can predict occurrence of lightning in the installation area of the wind turbine 1 by detecting a rapid change in the electrostatic field between the atmosphere and the ground immediately before lightning strikes. Accordingly, the controller 10 can execute a process to shift the operation mode of the wind turbine 1 to the lightning-protection mode in advance before occurrence of lightning in the installation area of the wind turbine 1 or in the vicinity thereof, in response to a trigger, which is a detection signal indicating detection of a change in the electrostatic field between the atmosphere and the ground.

Next, the controller 10 (wind farm controller) will be described in detail.

FIG. 3 is a control block diagram of a configuration of a control system of the controller 10 (controller of a wind farm) according to some embodiments.

As depicted in FIG. 3, in some embodiments, the controller 10 is a computer, for instance, and may include a CPU 12 (processor), a read only memory (ROM) 14 serving as a storage part for storing data such as various tables and programs to be executed by the CPU 12, a random access memory (ROM) functioning as a work area such as an evolution area and a computation area for executing the programs, as well as other non-depicted components, including a non-volatile magnetic disc storage device serving as a mass storage, a communication interface for connecting to a communication network, and an access part for mounting an external storage. The above components are all connected via a bus 18 which is electrically connected to the driving units of each wind turbine 1 of the wind turbine power generation facility 100 via the signal line 50 (see FIG. 1). Further, the controller 10 may be connected to an input part (not depicted) including a key board and a mouse, for instance, and to a display part (not depicted) including a liquid crystal monitor for displaying data, for instance.

As depicted in FIG. 3, in some embodiments, the controller 10 may be configured to receive detection signals related to wind direction, wind velocity, load, and lightning-occurrence state, respectively from a wind-direction sensor 31, a wind-velocity sensor 32, a load sensor 33, and a lightning sensor 34 disposed on each wind turbine 1. The above load sensor 33 may be disposed on one or more positions such as a main shaft bearing (not depicted) and the tower 6, to which apparatus loads and wind loads are applied. In some embodiments, the controller 10 may be electrically connected to the yaw motor 40, the yaw-brake drive actuator 41, the pitch-drive actuator 42, and the pitch-brake drive actuator 43, via the bus 18 and the signal line 50.

In some embodiments, the CPU 12 (processor) may be configured to receive an output signal of the lightning sensor 34 and to determine whether to switch the operation mode to the lightning-protection mode in accordance with operation-mode switching logics. With this configuration, the controller 10 can use the CPU 12 to determine whether to switch the operation mode to the lightning-protection mode in accordance with the operation-mode switching logics on the basis of an output signal from the lightning sensor 34. That is, it possible to operate the wind turbine 1 so as to be able to respond to various conditions for switching the operation mode by setting a variety of operation-mode switching logics.

As depicted in FIG. 3, in some embodiments, the ROM 14 may store: an operation-mode switching program 20 for the controller 10 to switch the operation mode of the wind turbine 1 to a lightning-protection mode that operates the wind turbine 1 at a rotor rotation speed lower than the rated rotation speed on the basis of an output signal of the lightning sensor 34; a first standby-mode executing program 21 for the controller 10 to switch the operation mode of the wind turbine 1 to the first lightning-protection mode (the first standby state) on the basis of an output signal of the lightning sensor 34; a second standby-mode executing program 22 for the controller 10 to switch the operation mode of the wind turbine 1 to the second lightning-protection mode (the second standby state) on the basis of an output signal of the lightning sensor 34; and a stop-mode executing program 23 for the controller 10 to shift the operation mode of the wind turbine 1 to the third lightning-protection mode (stop state) on the basis of an output signal of the lightning sensor 34. The above programs 20 to 23 will be described in order.

A method of operating the wind turbine power generation facility 100 according to some embodiments is realized through execution of the following programs 20 to 23 by the controller 10.

Figure 4:
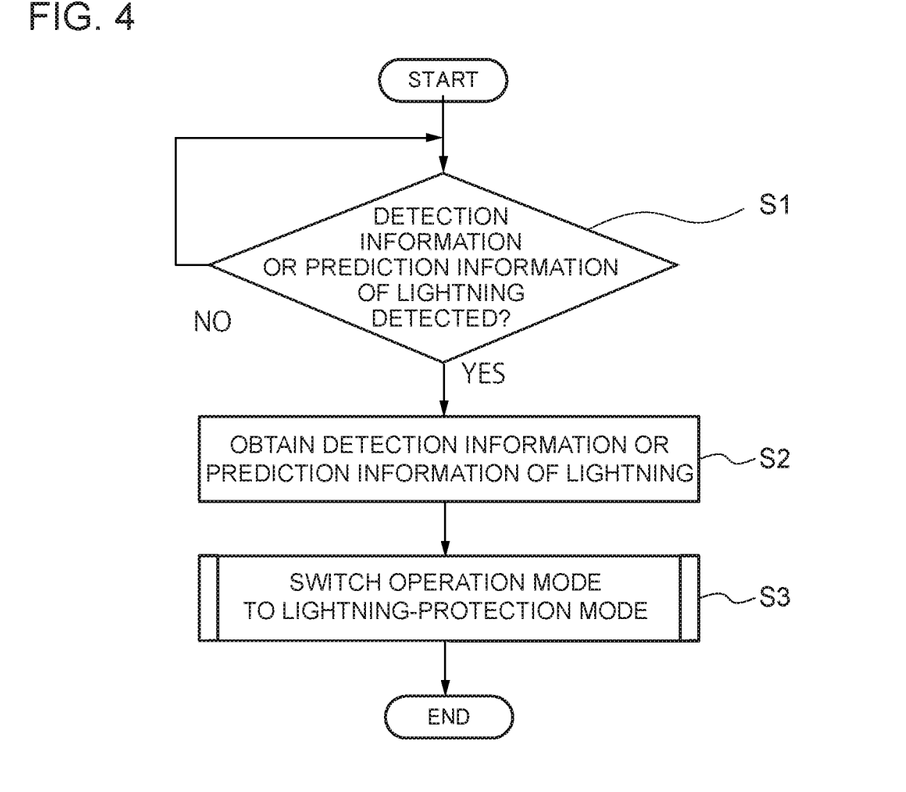
FIG. 4 is a flowchart of a method of operating a wind turbine power generation facility according to some embodiments.

FIG. 4 is a flowchart of a method of operating a wind turbine power generation facility according to some embodiments.

As shown in FIG. 4, the controller 10 (more specifically, the CPU 12) reads out the operation-mode switching program 20 stored in the ROM 16 to evolve the program 20 in the RAM 14, and executes the operation-mode switching program 20.

Specifically, the controller 10 determines whether detection information or prediction information of occurrence of lightning in the installation area of the wind turbine 1 is detected, on the basis of the presence of a detection signal or the content of the detection signal transmitted from the lightning sensor 34 (step S1). If the detection information or the prediction information is not detected (step S1: NO), the controller 10 repetitively determines whether the detection information or the prediction information is detected. If the detection information or the prediction information is detected (step S1: YES), the controller 10 obtains the detection information or the prediction information of occurrence of lightning in the installation area of the wind turbine 1 (step S2), and runs the process to shift the operation mode of the wind turbine 1 to the lightning-protection mode (step S3).

In some embodiments, "the detection information or the prediction information of lightning" may include not only the results of detection by the lightning sensor 34 that belongs to the wind turbine power generation facility 100, but also lightning forecast information obtained from a locally-established industrial lightning-observation network, or a lightning detection network (LDN). Further, the lightning-protection mode may include the first standby mode, the second standby mode, and the stop mode described below.

Figure 5:
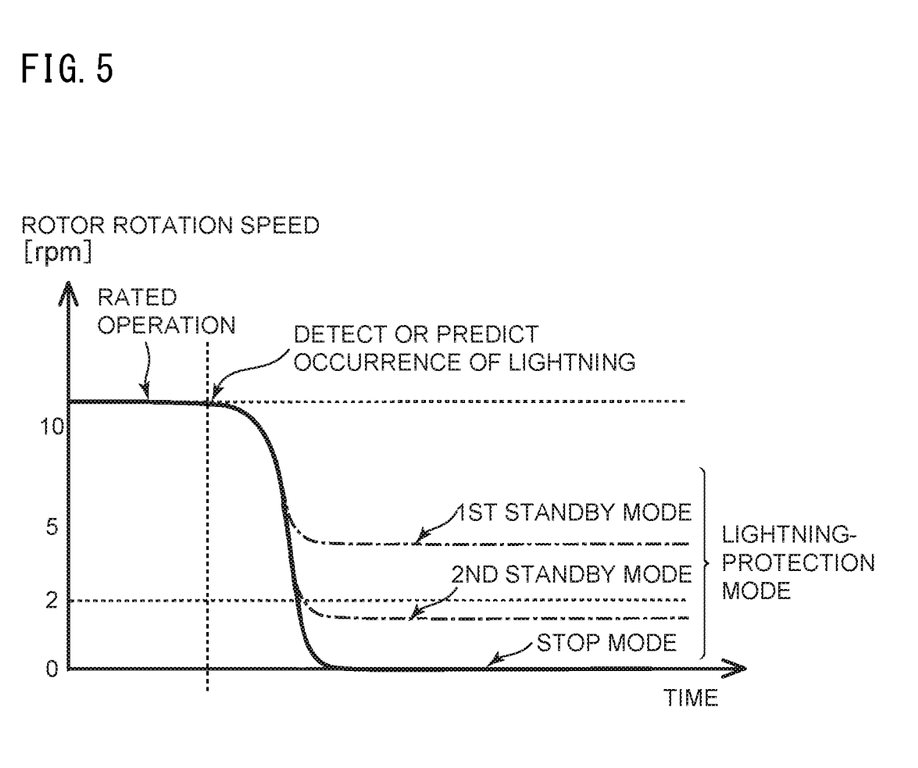
FIG. 5 is a diagram for describing a method of operating a wind turbine power generation facility according to an embodiment.
Figure 6:
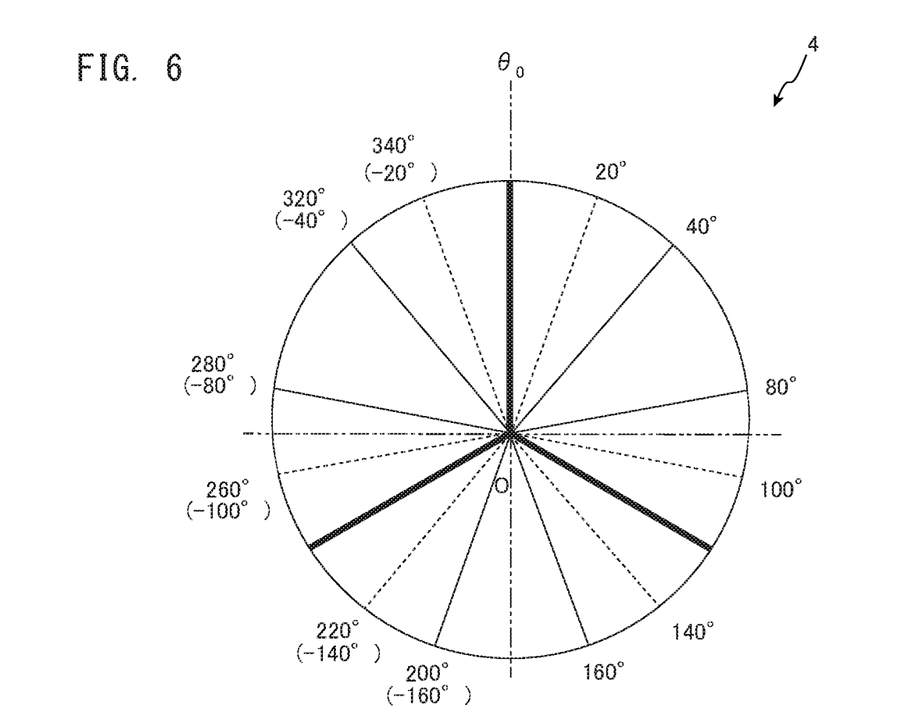
FIG. 6 is a schematic diagram of the azimuth angle in a lightning-protection mode of a wind turbine power generation facility according to an embodiment.

FIG. 5 is a diagram for describing a method of operating a wind turbine power generation facility according to an embodiment. As depicted in FIG. 5, the controller 10 may be configured to shift the wind turbine 1 to a standby state (the first standby state) in which power generation is stopped without fixing the rotor 4, upon switch to the lightning-protection mode (step S3). In other words, the controller 10 may be configured to read out the first standby-mode executing program 21 stored in the ROM 16 to evolve the program 21 in the RAM 14, and to execute the first standby-mode executing program 21.

By executing the first standby-mode executing program 21, the controller 10 executes a process to shift the state of the wind turbine 1 to one in which the rotor rotation speed is lower than the rated rotation speed.

With the above configuration, the controller 10 can shift the state of the wind turbine 1 to a state in which power generation is stopped without fixing the rotor 4, upon switch to the lightning-protection mode. In other words, when the state of the wind turbine 1 is shifted to the standby state by the controller 10, power generation can be stopped in a state in which the rotation speed of the rotor 4 is lower than the rated rotation speed but the rotor 4 is not completely stopped. Accordingly, when lightning is accompanied by strong wind, for instance, it is possible to standby in a state in which power generation is stopped while letting loads applied to the rotor 4 escape until the risk of occurrence of lightning decreases.

The above standby state may include an idle state in which the wind turbine 1 can recover to a state capable of generating power shortly when the possibility of occurrence of lightning in the installation area of the wind turbine 1 decreases sufficiently.

In some embodiments, the lightning-protection mode may be set so as to satisfy at least one of the first condition that the rotor rotation speed of the wind turbine 1 is 2 rpm or less, or the second condition that the tip speed of the blades 2 of the wind turbine 1 is 15 m/s or less (second standby mode).

In other words, the controller 10 may be configured to read out the second standby-mode executing program 22 stored in the ROM 16 to evolve the program 22 in the RAM 14, and to execute the second standby-mode executing program 22.

The rated rotation speed of a wind turbine varies depending on the size of the wind turbine and other conditions, but is normally set to approximately 10 to 50 rpm.

In this regard, with the above configuration, the operation mode of the wind turbine 1 is shifted to the lightning-protection mode by the controller 10, and thereby satisfies at least one of the first condition that the rotor rotation speed of the wind turbine 1 is 2 rpm or less, or the second condition that the tip speed of the blades 2 of the wind turbine 1 is 15 m/s or less. Thus, it is possible to reduce the rotation speed of the rotor 4 in the lightning-protection mode sufficiently as compared to the rated rotation speed, thereby preventing lightning strikes on an unexpected portion of the blades 2 and reducing damage to the blades 2 due to lightning. Accordingly, it is possible to mitigate damage to the blades 2 upon occurrence of lightning.

In the present specification, "the lightning-protection mode in which the rotor rotation speed is lower than the rated rotation speed" may include not only an idle state but also a state in which the rotor 4 is completely stopped.

In other words, as depicted in FIG. 5, in some embodiments, the controller 10 may be configured to shift the wind turbine 1 to a stop state (stop mode) in which power generation is stopped and the rotor 4 is also stopped, upon switch to the lightning-protection mode.

Specifically, the controller 10 may be configured to read out the stop-mode executing program 23 stored in the ROM 16 to evolve the program 23 in the RAM 14, and to execute the stop-mode executing program 23.

With this configuration, it is possible to shift the state of the wind turbine 1 to the stop state in which the rotor 4 is stopped and power generation is stopped, by shifting the operation mode of the wind turbine 1 to the lightning-protection mode by the controller 10. Accordingly, lightning strikes on an unexpected portion of the blades 2 is prevented and the wind turbine 1 is in the stop state in which the rotation speed of the rotor 4 is the lowest, which makes it possible to mitigate damage to the blades 2 upon occurrence of lightning as compared to a case in which the rotor 4 is rotating at the rated rotation speed when hit by lightning. Further, for instance, if the wind turbine 1 is stopped while the rotor 4 is positioned at a particular angle, it is possible to stand by with the rotor 4 stopped until the risk of occurrence of lightning decreases, while the rotor 4 is still positioned at the particular angle.

When switching the operation mode of the wind turbine 1 to the lightning-protection mode, the controller 10 executes a process (i.e. shutdown) to shift the state of the wind turbine 1 to the above described stop state, and then permits the rotor 4 to rotate slightly in accordance with an influence from wind or the attitude control of the wind turbine 1 in association with lightning protection, for instance. Alternatively, the controller 10 may be configured to realize the above standby state by controlling the rotor rotation speed to be less than the rated rotation speed (or less than the cut-in rotation speed).

The risk of being hit by lightning varies depending on the azimuth-angular range in which the rotor 4 is positioned. In this regard, the present inventors conducted intensive researches and found that it is possible to reduce the risk of lightning strikes on the blades 2 considerably by avoiding a situation in which the blades 2 are positioned in the first angular range of greater than 80 degrees and less than 100 degrees and the second angular range of greater than 260 degrees and less than 280 degrees in the clockwise direction, provided that the top position at 12' clock position in the front view of the rotor 4 is zero degree.

FIG. 7 is a schematic diagram of an azimuth angle in a lightning-protection mode of a wind turbine power generation facility according to an embodiment.

As depicted in FIG. 7, in some embodiments, in the lightning-protection mode, the wind turbine 1 may be configured to stop the rotor 4 so that all the blades 2 are positioned in an azimuth-angular range excluding the first angular range of greater than 80 degrees and less than 100 degrees and the second angular range of greater than 260 degrees and less than 280 degrees in the clockwise direction, provided that the top position at 12' clock position in the front view of the rotor 4 is zero degree.

If the wind turbine 1 has three blades 2, for instance, each blade 2 is disposed at an angular degree of 120 degrees with respect to the adjacent blade 2. In this case, the wind turbine 1 may be configured to stop the rotor 4 so that all the blades 2 are positioned in the third angular range of from 100 to 140 degrees, the fourth angular range of from 220 to 260 degrees, and the fifth angular range of from 340 degrees to 20 degrees in the clockwise direction, provided that the top position at 12' clock position in the front view of the rotor 4 is zero degree. More preferably, the wind turbine 1 may be configured to stop the rotor 4 so that all the blades 2 are positioned in the sixth angular range of from 40 to 80 degrees, the seventh angular range of from 160 to 200 degrees, and the eighth angular range of from 280 degrees to 320 degrees in the clockwise direction, provided that the top position at 12' clock position in the front view of the rotor 4 is zero degree.

With this configuration, the rotor 4 can be stopped so that all the blades 2 are positioned in an azimuth-angular range other than the first and second angular ranges, and thus it is possible to reduce the risk of lightning strikes on the blades 2 considerably. Accordingly, it is possible to mitigate damage to the blades 2 upon occurrence of lightning.

The controller 10 according to some embodiments described above may include a plurality of information-processing units. The information-processing units may perform respective processes dispersedly.

Further, the above described various processes may be performed by storing programs for executing the processes of the above described embodiments in a storage medium readable by a computer, reading the programs stored in the storage medium into a computer system, and executing the programs.

The "computer system" herein may include an operation system (OS) and hard ware such as accessories. Further, "computer system" may include a website providing environment (or display environment) if the world wide web (WWW) system is used. Further, "storage medium readable by a computer" refers to a storage device, including a flexible disk, a magneto-optical disc, a read-only memory (ROM), a writable non-volatile memory such as a flash memory, a portable medium such as a compact disc (CD-ROM), and a hard disc built into a computer system.

Moreover, "storage medium readable by a computer" also includes a medium that stores programs for a certain period of time, such as a server in a case in which programs are transmitted via a network like the Internet or a communication line like a phone line, and a volatile memory inside a client computer system (e.g. dynamic random access memory, or DRAM). Further, the programs may be transmitted from a computer system with a storage storing the programs to another computer system via a transmission medium or transmission waves inside the transmission medium. Herein, the "transmission medium" for transmitting the programs refers to a medium with a function to transmit information, such as a network (communication network) like the Internet and a communication line like a phone line. Furthermore, the programs may be provided to realize a part of the above described functions. Further, the programs may be difference files (difference programs) for realizing the above described function in combination with a program already stored in a computer system.

Embodiments of the present invention were described in detail above, but the present invention is not limited thereto, and various amendments and modifications may be implemented.

REFERENCE SIGNS LIST

1 Wind turbine (wind turbine power generating apparatus)
2 Blade (wind turbine blade)
3 Hub
4 Rotor
5 Nacelle
6 Tower
7 Base
10 Controller
12 CPU (processor)
14 RAM
16 ROM (storage part)
18 Bus
20 Operation-mode switching program
21 First standby-mode executing program
22 Second standby-mode executing program
23 Stop-mode executing program
31 Wind-direction sensor
32 Wind-velocity sensor
33 Load sensor
34 Lightning sensor
40 Yaw motor
41 Yaw-brake drive actuator
42 Pitch-drive actuator
43 Pitch-brake drive actuator
50 Signal line
61 Electrode
62 Metal powder
63 Insulating member
64 Lead wire
100 Wind turbine power generation facility

The invention claimed is:

1. A wind turbine power generation facility, comprising:
at least one wind turbine power generating apparatus including a blade;
a lightning sensor for detecting or predicting occurrence of lightning in an installation area of the at least one wind turbine power generating apparatus, prior to lightning strike to the blade; and
a controller for switching an operation mode of the at least one wind turbine power generating apparatus to a lightning-protection mode in which a rotor rotation speed is lower than a rated rotation speed so as to prevent the lightning strike on an unexpected portion on the blade of the at least one wind turbine power generating apparatus, on a basis of an output signal of the lightning sensor,
wherein the controller is configured to shift a state of the at least one wind turbine power generating apparatus to a standby state as the lightning-protection mode in which power generation is stopped without fixing a rotor, upon switching to the lightning-protection mode, and
wherein the lightning-protection mode satisfies at least one of a first condition that the rotor rotation speed of the at least one wind turbine power generating apparatus is 2 rpm or less, or a second condition that a blade tip speed of the at least one wind turbine power generating apparatus is 15 m/s or less.

2. The wind turbine power generation facility according to claim 1,
wherein the at least one wind turbine power generating apparatus has a rotor diameter of 70 m or more.

3. The wind turbine power generation facility according to claim 1,
wherein the lightning sensor includes at least one of an optical sensor for detecting light which occurs accompanying the lightning, or a sonic sensor for detecting sound which occurs accompanying the lightning.

4. The wind turbine power generation facility according to claim 1,
wherein the lightning sensor includes an electromagnetic-wave sensor for detecting electromagnetic waves which occur accompanying the lightning.

5. The wind turbine power generation facility according to claim 1,
wherein the lightning sensor includes an electric-charge sensor configured to detect electric charge accumulated in cloud or on ground.

6. The wind turbine power generation facility according to claim 1,
wherein the lightning sensor includes a coherer.

7. The wind turbine power generation facility according to claim 1,
wherein the controller includes a processor configured to receive the output signal of the lightning sensor and to determine whether to switch the operation mode to the lightning-protection mode in accordance with operation-mode switching logics.

8. The wind turbine power generation facility according to claim 1,
wherein the lightning sensor is configured to detect light or sound of the lightning, and
the controller is configured to switch the operation mode of the at least one wind turbine power generating apparatus to the lightning-protection mode in response to the lightning sensor detecting the light or sound of the lightning.

9. A method of operating a wind turbine power generation facility including at least one wind turbine power generating apparatus having a blade, the method comprising:
obtaining detection information or prediction information of occurrence of lightning in an installation area of the at least one wind turbine power generating apparatus, prior to lightning strike to the blade; and
switching an operation mode of the at least one wind turbine power generating apparatus to a lightning-protection mode in which a rotor rotation speed is lower than a rated rotation speed so as to prevent the lightning strike on an unexpected portion on the blade of the at least one wind turbine power generating apparatus, on a basis of the detection information or the prediction information of the lightning,
wherein the step of switching the operation mode to the lightning-protection mode includes shifting a state of the at least one wind turbine power generating apparatus to a standby state as the lightning-protection mode in which power generation is stopped without fixing a rotor, and wherein the lightning-protection mode satisfies at least one of a first condition that the rotor rotation speed of the at least one wind turbine power generating apparatus is 2 rpm or less, or a second condition that a blade tip speed of the at least one wind turbine power generating apparatus is 15 m/s or less.

10. A wind turbine power generation facility, comprising:
a plurality of wind turbines;
a lightning sensor disposed at a location independent of the plurality of wind turbines and configured to detect or predict occurrence of lightning in an installation area of the wind turbines prior to lightning strike to a blade of any one of the wind turbines; and
a controller for outputting a switching command to the plurality of wind turbines to switch an operation mode of the plurality of wind turbines to a lightning-protection mode in which a rotor rotation speed is lower than a rated rotation speed so as to prevent the lightning strike on an unexpected portion on the blade of said any one of the wind turbines, on a basis of an output signal of the lightning sensor.

11. The wind turbine power generation facility according to claim 10,
wherein the controller is configured to shift a state of the plurality of wind turbines to a stop state in which a rotor is stopped and power generation is stopped, upon switching to the lightning-protection mode.

12. The wind turbine power generation facility according to claim 11,
wherein the plurality of wind turbines is configured to stop the rotor so that all blades are positioned in an azimuth-angular range other than a first angular range of more than 80 degrees and less than 100 degrees, and a second angular range of more than 260 degrees and less than 280 degrees, in the lightning-protection mode.

13. A method of operating a wind turbine power generation facility including a plurality of wind turbines, the method comprising:
obtaining detection information or prediction information of occurrence of lightning in an installation area of the plurality of wind turbines prior to lightning strike to a blade of any one of the wind turbines, by using a lightning sensor disposed at a location independent of the plurality of wind turbines; and
outputting a switching command to the plurality of wind turbines to switch an operation mode of the plurality of wind turbines to a lightning-protection mode in which a rotor rotation speed is lower than a rated rotation speed so as to prevent the lightning strike on an unexpected portion on the blade of said any one of the wind turbines, on a basis of an output signal of the lightning sensor.

14. The method of operating a wind turbine power generation facility according to claim 13,
wherein the switching command includes shifting a state of the plurality of wind turbines to a stop state in which a rotor is stopped and power generation is stopped.

15. The method of operating a wind turbine power generation facility according to claim 14,
wherein the switching command includes stopping the rotor so that all blades are positioned in an azimuth-angular range other than a first angular range of more than 80 degrees and less than 100 degrees, and a second angular range of more than 260 degrees and less than 280 degrees.

* * * * *